(12) United States Patent
Shi et al.

(10) Patent No.: US 12,289,068 B2
(45) Date of Patent: Apr. 29, 2025

(54) DIRECT DRIVE TRANSMISSION SYSTEM AND CONTROL METHOD

(71) Applicant: AAC Technologies (Nanjing) Co., Ltd., Nanjing (CN)

(72) Inventors: Weiling Shi, Nanjing (CN); Xueyuan Zhu, Nanjing (CN); Shun Guo, Nanjing (CN); Lin Qian, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 190 days.

(21) Appl. No.: 18/338,380

(22) Filed: Jun. 21, 2023

(65) Prior Publication Data

US 2024/0178780 A1    May 30, 2024

Related U.S. Application Data

(63) Continuation of application No. PCT/CN2023/087085, filed on Apr. 7, 2023.

(30) Foreign Application Priority Data

Nov. 29, 2022   (CN) .......................... 202211510271.2

(51) Int. Cl.
*H02P 25/064* (2016.01)
*H02K 41/03* (2006.01)

(52) U.S. Cl.
CPC ......... *H02P 25/064* (2016.02); *H02K 41/031* (2013.01)

(58) Field of Classification Search
CPC .......................... H02P 25/064; H02K 41/031
See application file for complete search history.

(56) References Cited

U.S. PATENT DOCUMENTS

| | | | |
|---|---|---|---|
| 2023/0080579 A1* | 3/2023 | Suzuki | B29C 65/7867 156/361 |
| 2023/0275499 A1* | 8/2023 | Shen | H02K 41/031 |
| 2023/0291294 A1* | 9/2023 | Wang | H02K 41/031 |

* cited by examiner

*Primary Examiner* — Zoheb S Imtiaz
(74) *Attorney, Agent, or Firm* — Wiersch Law Group

(57) ABSTRACT

The present disclosure provides a direct drive transmission system and a control method. The direct drive transmission system includes: a base plate, guide rails, a plurality of stators, a mover, a plurality of drivers, and a controller. The plurality of stators are configured to drive the mover to slide on the guide rails. A transmission line composed of the plurality of stators is configured to have at least one low-accuracy segment and at least one high-accuracy segment connected to each other. The direct drive transmission system further includes at least one first switching signal device and a plurality of second switching signal devices. The at least one first switching signal device aligns with a respective second switching signal device, and each second switching signal device is electrically connected to a respective driver or the plurality of second switching signal devices are all electrically connected to the controller.

8 Claims, 5 Drawing Sheets

DIRECT DRIVE TRANSMISSION SYSTEM AND CONTROL METHOD

CROSS REFERENCE TO RELATED APPLICATIONS

The present application is a continuation of PCT Patent Application No. PCT/CN2023/087085, filed Apr. 7, 2023, which claims priority to Chinese patent application No. 202211510271.2, filed Nov. 29, 2022, each of which is incorporated by reference herein in its entirety.

TECHNICAL FIELD

The present disclosure relates to the field of direct drive transmission technology, and in particular to a control method and a device for a direct drive transmission system.

BACKGROUND

With the development of direct drive transmission system technology, the control methods of direct drive transmission systems have been widely applied in various direct drive motors.

In a relevant technology, a direct drive transmission system includes: a stator composed of a plurality of windings, and a position feedback device configured to feed back relative positions of the stator and a mover. Cooperative control algorithms are used to control stators, and coils in the windings are energized to drive the mover to move. The position feedback device (such as an absolute grating ruler, a magnetic grid ruler or the like) is relatively expensive, and some parts of the transmission system do not require high positioning accuracy. However, these parts still are equipped with position feedback devices, resulting in higher costs of the direct drive transmission system.

Therefore, it is necessary to provide a new direct drive transmission system.

SUMMARY

The present disclosure aims to provide a direct drive transmission system and a control method, which can address the technical problem that the direct drive transmission systems in the relevant technologies have relatively high cost.

To this end, the direct drive transmission system includes: a base plate; guide rails fixed to the base plate; a plurality of stators fixed to the base plate along an extension direction of the guide rails and sequentially connected to each other; a mover slidably fitted to the guide rails and arranged to space from the plurality of stators; a plurality of drivers; and a controller electrically connected to the plurality of drivers. Each driver of the plurality of drivers is electrically connected to a respective stator, and the plurality of stators are configured to drive the mover to slide on the guide rails. A transmission line composed of the plurality of stators is configured to have at least one low-accuracy segment and at least one high-accuracy segment connected to each other. The direct drive transmission system further includes at least one first switching signal device fixed to the mover, and a plurality of second switching signal devices fixed to the base plate. Each stator of stators located in the at least one low-accuracy segment of the plurality of stators is in correspondence to a respective second switching signal device. The at least one first switching signal device aligns with a respective second switching signal device, and each second switching signal device of the plurality of second switching signal devices is electrically connected to a respective driver or the plurality of second switching signal devices are all electrically connected to the controller.

In some embodiments, each stator of the plurality of stators has a front end facing towards a sliding direction of the mover, and a respective second switching signal device is disposed at the front end of each stator. The direct drive transmission system includes two first switching signal devices, and each first switching signal device of the two first switching signal devices is disposed at a respective end of the mover.

In some embodiments, each second switching signal device of the plurality of second switching signal devices is electrically connected to respective drivers to which each two adjacent stators of the plurality of stators are connected.

In some embodiments, each stator of the plurality of stators includes a first magnet fixed to the base plate, a plurality of protrusions protruded from the first magnet in a direction away from a surface of the base plate, and a plurality of coils. Each coil of the plurality of coils is wound on an outer surface of a respective protrusion. The plurality of protrusions are arranged at intervals along the extension direction of the guide rails, each two adjacent coils are arranged to space from each other, and all coils of a stator are electrically connected to a corresponding driver.

In some embodiments, the mover includes a mounting plate slidably fitted to the guide rails, a second magnet fixed on a side of the mounting plate facing towards the base plate, and a plurality of magnetic steels fixed on a side of the second magnet away from the mounting plate. Each magnetic steel of the plurality of magnetic steels is in correspondence to and aligns with a respective coil, and the plurality of magnetic steels are arranged to space from the plurality of protrusions.

The control method for a direct drive transmission system is applicable to the direct drive transmission system as illustrated above. The control method includes: receiving a triggering signal from a second switching signal device; determining a driver to be driven according to the triggering signal; and sending a control instruction to the driver to be driven.

In some embodiments, the mover has two first switching signal devices, each first switching signal device of the two first switching signal devices is disposed at a respective end of the mover, and determining the driver to be driven according to the triggering signal, includes: acquiring a specific value of the second switching signal device sending the triggering signal, where the specific value refers to a sequence number of a stator corresponding to the second switching signal device in a sliding direction of the mover; and determining a driver to which the stator corresponding to the specific value to be the driver to be driven.

In some embodiments, acquiring the specific value of the second switching signal device sending the triggering signal, includes: acquiring a pointer in the triggering signal; and determining, based on the pointer, the specific value of the second switching signal device sending the trigger signal in a mapping table. The mapping table is preset in the controller and includes mapping relationships among pointers, the plurality of stators and specific values.

In some embodiments, each stator of the plurality of stators has a front end facing towards a sliding direction of the mover, a respective second switching signal device is disposed at the front end of each stator, and each second switching signal device of the plurality of second switching signal devices is electrically connected to respective drivers to which each two adjacent stators of the plurality of stators are connected. Determining the driver to be driven according to the triggering signal, includes: determining, according to the triggering signal, two stators which are arranged to be adjacent to the second switching signal device sending the triggering signal; and determining a driver to which the two stators are connected to be the driver to be driven.

In some embodiments, the stators located in the at least one low-accuracy segment of the plurality of stators are driven by corresponding drivers of the plurality of drivers by sensorless control or frequency-converting control, and the corresponding drivers are all electrically connected to the controller.

The present disclosure has following beneficial effects: when the plurality of second switching signal devices are electrically connected to corresponding drivers, the drivers receive triggering signals generated by the plurality of second switching signal devices and transmit the triggering signals to the controller, and the controller sends control instructions to corresponding drivers according to the triggering signals; and when the plurality of second switching signal devices are all electrically connected to the controller, the controller receives triggering signals generated by the plurality of second switching signal devices and sends control instructions to corresponding drivers according to the triggering signals, such that the controller can send control instructions to corresponding drivers according to the triggering signals generated by triggering the plurality of second switching signal devices by the at least one first switching signal device, thereby driving the mover to slide on the guide rails by the plurality of stators under the control of the plurality of drivers, and implementing movement control of the mover on the at least one low-accuracy segment of the transmission line. In this way, expensive position feedback devices can be replaced by switching signal devices in the low-accuracy segments of the transmission line, thereby reducing the usage of position feedback devices and reducing hardware costs. Moreover, due to simple movement control of the mover on the low-accuracy segments of the transmission line, control costs can be reduced, thereby further reducing the cost of the direct drive transmission system.

DETAILED DESCRIPTION OF EMBODIMENTS

The present disclosure is further illustrated below with reference to drawings and embodiments.

Figure 1:
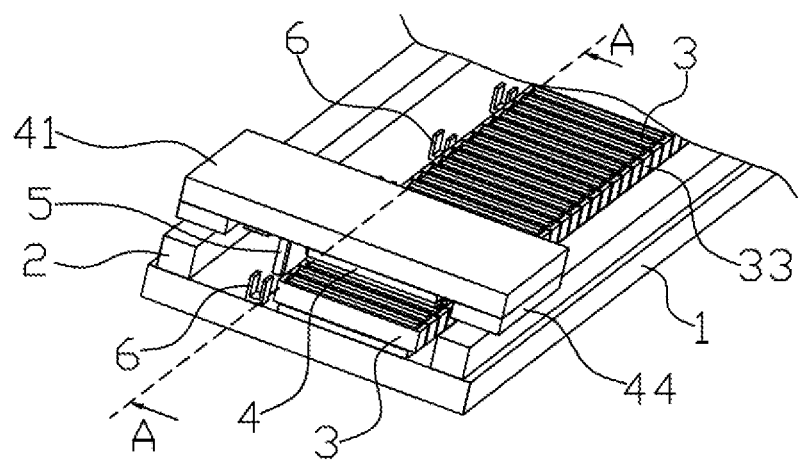
FIG. 1 is a structural diagram of the direct drive transmission system according to embodiments of the present disclosure.
Figure 2:
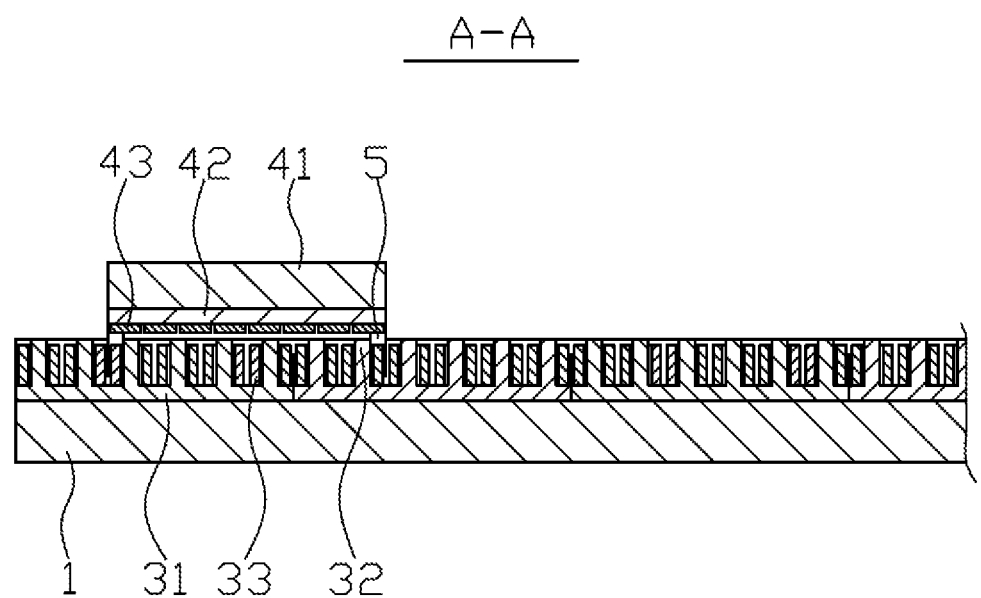
FIG. 2 is a sectional view along the A-A line in FIG. 1.
Figure 3:
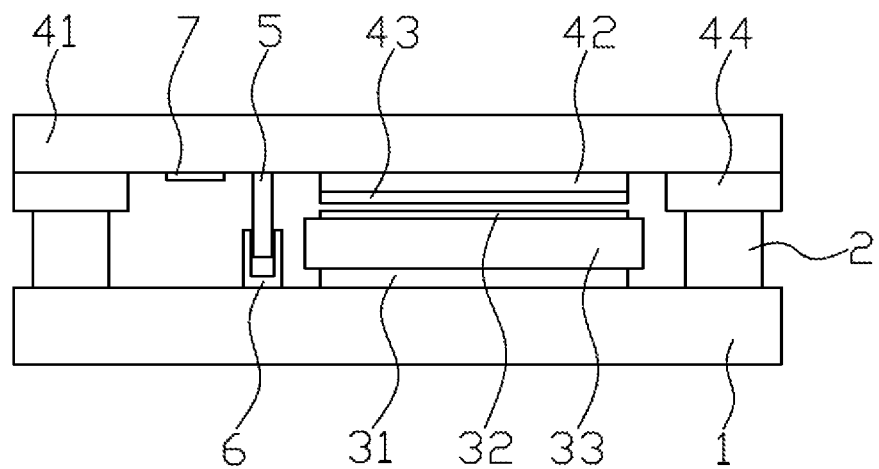
FIG. 3 is a front view of the direct drive transmission system according to embodiments of the present disclosure.

Referring to FIGS. 1 to 3, embodiments of the present disclosure provide a direct drive transmission system, including: a base plate 1; guide rails 2 fixed to the base plate 1; a plurality of stators 3 fixed to the base plate 1 along an extension direction of the guide rails 2 and sequentially connected to each other; a mover 4 slidably fitted to the guide rails 2 and arranged to space from the plurality of stators 3; a plurality of drivers (not shown in drawings); and a controller (not shown in drawings) electrically connected to the plurality of drivers. Each driver of the plurality of drivers is electrically connected to a respective stator 3, and the plurality of stators 3 are configured to drive the mover 4 to slide on the guide rails 2. A transmission line composed of the plurality of stators 3 is configured to have at least one low-accuracy segment and at least one high-accuracy segment connected to each other. The direct drive transmission system further includes at least one first switching signal device 5 fixed to the mover 4, and a plurality of second switching signal devices 6 fixed to the base plate 1. Each stator of stators located in the at least one low-accuracy segment of the plurality of stators 3 is in correspondence to a respective second switching signal device 6. The at least one first switching signal device 5 aligns with a respective second switching signal device 6, and each second switching signal device of the plurality of second switching signal devices 6 is electrically connected to a respective driver or the plurality of second switching signal devices 6 are all electrically connected to the controller.

It should be understood that when the plurality of second switching signal devices 6 are electrically connected to corresponding drivers, the drivers receive triggering signals generated by the plurality of second switching signal devices 6 and transmit the triggering signals to the controller, and the controller sends control instructions to corresponding drivers according to the triggering signals; and when the plurality of second switching signal devices 6 are all electrically connected to the controller, the controller receives triggering signals generated by the plurality of second switching signal devices 6 and sends control instructions to corresponding drivers according to the triggering signals, such that the controller can send control instructions to corresponding drivers according to the triggering signals generated by triggering the plurality of second switching signal devices 6 by the at least one first switching signal device 5, thereby driving the mover 4 to slide on the guide rails 2 by the plurality of stators 3 under the control of the plurality of drivers, and implementing movement control of the mover 4 on the at least one low-accuracy segment of the transmission line. In this way, expensive position feedback devices can be replaced by switching signal devices in the low-accuracy segments of the transmission line, thereby reducing the usage of position feedback devices and reducing hardware costs. Moreover, due to simple movement control of the mover 4 on the low-accuracy segments of the transmission line, control costs can be reduced, thereby further reducing the cost of the direct drive transmission system.

Referring to FIGS. 1 to 3, in some embodiments, each stator of the plurality of stators 3 includes a first magnet 31 fixed to the base plate 1, a plurality of protrusions 32 protruded from the first magnet 31 in a direction away from a surface of the base plate 1, and a plurality of coils 33, each coil of the plurality of coils 33 is wound on an outer surface of a respective protrusion 32. The plurality of protrusions 32 are arranged at intervals along the extension direction of the guide rails 2, each two adjacent coils 33 are arranged to space from each other, and all coils 33 of a stator 3 are electrically connected to a corresponding driver. The first magnet 31 may be a magnetic plate, the plurality of protrusions 32 may be in a form of rectangular plates, and the plurality of protrusions 32 are arranged at constant intervals. Each coil 33 and a respective protrusion 32 together form a winding, such that a uniformly distributed traveling-wave magnetic field can be generated by applying appropriate current to the winding. By arranging each two adjacent coils 33 to space from each other, heat dissipation spaces can be provided to coils 33, and it is conducive to formation of a coil 33 by winding wires on an outer surface of a protrusion 32. By electrically connecting all coils 33 of a stator 3 to a corresponding driver, one stator 3 can be driven by one driver, in this way, number of drivers in the direct drive transmission system can be reduced, thereby reducing cost of the direct drive transmission system.

Referring to FIGS. 1 to 3, in some embodiments, the mover 4 includes a mounting plate 41 slidably fitted to the guide rails 2, a second magnet 42 fixed on a side of the mounting plate 41 facing towards the base plate 1, and a plurality of magnetic steels 43 fixed on a side of the second magnet 42 away from the mounting plate 41. Each magnetic steel of the plurality of magnetic steels 43 is in correspondence to and aligns with a respective coil 33, and the plurality of magnetic steels 33 are arranged to space from the plurality of protrusions 32. In some embodiments, there are two guide rails 2 spaced from each other, and each end of the mounting plate 41 is slidably fitted to a respective guide rail 2, which is conducive to improvement of sliding stability of the mover 4. The second magnet 42 is in a form of a flat plate, and the plurality of magnetic steels 43 are evenly arranged on the second magnet 42. Each magnetic steel 43 is in correspondence to and aligns with a respective coil 33, such that a coil 33 and a respective protrusion 32 together form a winding arranged to align with a respective magnetic steel 43. It should be understood that when the direct drive transmission system is in a standby mode, the plurality of magnetic steels 43 generate a magnetic field by induction, such that a gap magnetic field is generated between the plurality of magnetic steels 43 and windings. A traveling-wave magnetic field may be generated by applying appropriate current to the windings, in this case, the gap magnetic field and the traveling-wave magnetic field interact to generate thrust between the plurality of magnetic steels 43 and the windings, causing the mover 4 is driven by the plurality of stators 3 to slide on the guide rails 2 in a direction of the thrust.

Referring to FIGS. 1 to 3, in some embodiments, the mover 4 further includes a sliding plate 44 fixed to the mounting plate 41, each end of the sliding plate is slidably fitted to a respective guide rail 2. The sliding plate 44 has a first limit structure, each guide rail 2 has a second limit structure, and the first and second limit structures cooperate to limit the sliding plate 44 to slide only along the extension direction of the guide rails 2. The first limit structure may be limit parts each formed by bending a respective end of the sliding plate 44 towards the base plate 1 by 90° and then bending the end towards a guide rail 2 by 90°, and the second limit structure may be limit grooves extending in the extension direction of the guide rails 2, each of the limit grooves is defined on a side of a respective guide rail 2. Each of the limit parts fits into a respective limit groove, to prevent the sliding plate 44 from detaching from the guide rails 2. In this way, the stability of the mover 4 when sliding on the guide rails 2 can be secured.

It is noted that the first magnet 31 and the second magnet 42 have identical shape and dimension. Each of the plurality of windings is arranged to align with a respective magnetic steel 43, such that a driving range of a stator 3 can match with a mover 4. A number of movers 4, a number of stators 3, and numbers of the windings and magnetic steels 43 may be determined according to actual requirement, and will not be specifically defined herein. The at least one low-accuracy segment and the at least one high-accuracy segment may be arranged in an alternate way, such that the mover 4 may move either from a high-accuracy segment to a low-accuracy segment, or from a low-accuracy segment to a high-accuracy segment.

Referring to FIGS. 1 to 3, in some embodiments, each stator of the plurality of stators 3 has a front end facing towards a sliding direction of the mover 4 and a rear end. A respective second switching signal device 6 is disposed at the front end of each stator 3. The direct drive transmission system includes two first switching signal devices 5, each first switching signal device of the two first switching signal devices is disposed at a respective end of the mover 4. In some embodiments, a first switching signal device 5 may be a triggering sheet, and a second switching signal device 6 may be a photoelectric switch, which are conducive to reduction of hardware costs. By disposing a respective second switching signal device 6 at the front end of each stator 3, it can be timely determined, according to the triggering signal generated by the second switching signal device 6, that the mover 4 begins to enter a low-accuracy segment or a stator corresponding to the second switching signal device 6. One of the two first switching signal devices 5 triggers the second switching signal device 6 for a first time, and the other first switching signal device triggers the second switching signal device 6 for a second time.

In some embodiments, each second switching signal device of the plurality of second switching signal devices 6 is electrically connected to respective drivers to which each two adjacent stators of the plurality of stators 3 are connected. In a low-accuracy segment of the transmission line, the triggering signal generated by each second switching signal device 6 may be transmitted to the respective drivers to which each two adjacent stators 3 are connected. When the triggering signal is transmitted to the respective drivers to which each two adjacent stators 3 are connected for the first time, the controller receives the triggering signal transmitted from the respective drivers and determines that the mover 4 begins to move away from one of the two stators 3 which is in front of the other stator in the sliding direction of the mover 4, and is moving towards the other stator of the two stators 3. When the triggering signal is transmitted to the respective drivers to which each two adjacent stators 3 are connected for the second time, the controller may determine that the mover 4 just moves out of the driving range of one of the two stators 3 which is in front of the other stator in the sliding direction of the mover 4, and begins to move away from the other stator of the two stators 3.

It is noted that in the at least one low-accuracy segment and the at least one high-accuracy segment of the transmission line, disposing a respective second switching signal device 6 at the front end of a stator 3 located in a low-accuracy segment means that this second switching signal device 6 is disposed between the stator 3 located in the low-accuracy segment and a stator 3 located in a high-accuracy segment. When this second switching signal device 6 generates the triggering signal, the respective drivers to which each two adjacent stators 3 are connected receive the triggering signal and transmit it to the controller, and the controller may determine, according to the triggering signal, that the mover 4 begins to move out of the high-accuracy segment and move into the low-accuracy segment.

In some embodiments, the plurality of second switching signal devices 6 are all electrically connected to the controller, and the controller receives a triggering signal generated by a corresponding second switching signal device and sends, according to the triggering signal, a control instruction to the driver corresponding to the triggering signal. For a same second switching signal device 6, when the controller receives the triggering signal generated by the second switching signal device 6 for the first time, the controller may determine that the mover 4 begins to move away from one of the two stators 3 which is in front of the other stator in the sliding direction of the mover 4, and is moving towards the other stator of the two stators 3; and when the controller receives the triggering signal for the second time, the controller may determine that the mover 4 just moves out of the driving range of one of the two stators 3 which is in front of the other stator in the sliding direction of the mover 4, and begins to move away from the other stator of the two stators 3.

It is noted that when the mover 4 moves towards a stator 3, the controller sends a control instruction of increasing output current to a driver to which the stator 3 is connected, to ensure acceleration performance of the mover 4, and when the mover 4 moves away from the stator 3 and moves towards a next stator 3 connected with the stator 3, the controller sends a control instruction of decreasing output current to a driver to which the next stator 3 is connected, to prevent a fluctuation in the speed of the mover 4. It should be understood that the dynamic adjustment of current as illustrated above is beneficial for saving power of the plurality of drivers, thereby reducing cost of the direct drive transmission system.

A respective second switching signal device 6 may be disposed at the rear end of each stator 3 as needed. In this case, the first low-accuracy segment must be arranged behind a high-accuracy segment, to determine a real-time position of the mover 4. When the second switching signal device 6 is triggered for the first time, the mover 4 just completely moves in the driving range of the stator 3 corresponding to this second switching signal device 6, and when the second switching signal device 6 is triggered for the second time, the mover 4 just completely moves out of the driving range of the stator 3 corresponding to this second switching signal device 6.

Referring to FIGS. 1 to 3, in some embodiments, the direct drive transmission system further includes a first position feedback device 7 fixed to the mover 4, and a plurality of second position feedback devices fixed to the base plate 1. Each stator of stators located in the at least one high-accuracy segment of the plurality of stators 3 is in correspondence to a respective second position feedback device. The first position feedback device 7 aligns with a respective second position feedback device, and the first position feedback device 7 and the plurality of second position feedback devices are electrically connected to the controller. In some embodiments, the first position feedback device 7 may a reading head, and a second position feedback device may be an absolute grating ruler or a magnetic grid ruler, to ensure a high detection accuracy of the position of the mover 4 in a high-accuracy segment. With the cooperation of the first position feedback device 7 and the plurality of second position feedback devices, a real-time position of the mover 4 can be determined. A driver transmits information of the real-time position to the controller, and the controller sends, according to the information of the real-time position, control instructions to the driver of a respective stator 3.

Figure 4:
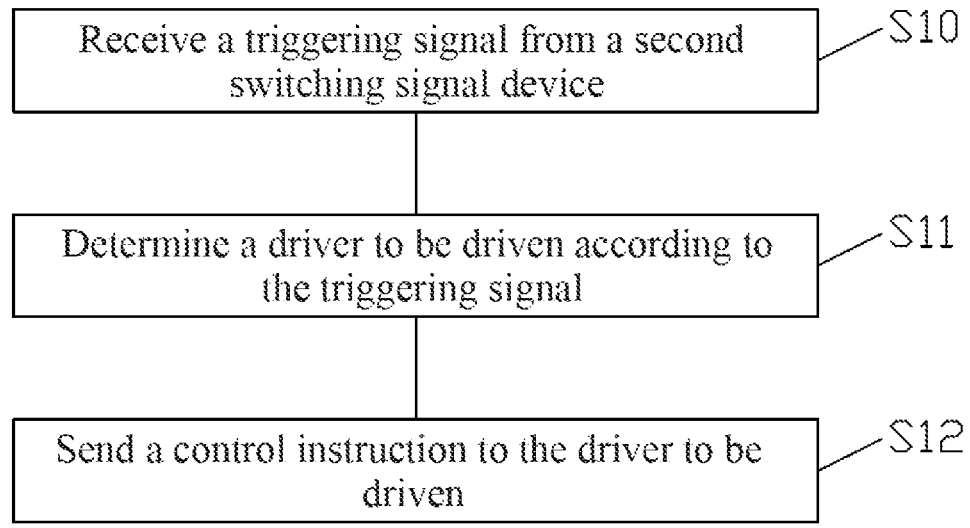
FIG. 4 is a basic flowchart of the control method for the direct drive transmission system according to embodiments of the present disclosure.

Referring to FIG. 4, embodiments of the present disclosure further provide a control method for a direct drive transmission system, applicable to the direct drive transmission system as illustrated above, including:

At S10, a triggering signal from a second switching signal device 6 is received.

At S11, a driver to be driven is determined according to the triggering signal.

At S12, a control instruction is sent to the driver to be driven.

At S10, the plurality of second switching signal devices 6 are triggered by the first switching signal device 5 of the mover 4 to generate triggering signals, and the triggering signals include position information of the mover 4 different from each other. The controller may receive the triggering signals generated by the plurality of second switching signal devices 6 through corresponding drivers, or directly receive the triggering signals. In other words, the controller may directly receive position information of the mover 4, without transmission of drivers, thereby simplifying the control method for the direct drive transmission system. At S12, sending, by the controller, the control instruction to the driver to be driven, includes: the driver outputs increased current to a corresponding stator 3, the driver outputs reduced current to the corresponding stator 3, and the driver outputs unchanged current to the corresponding stator 3. In this way, the plurality of stators 3 can drive the mover 4 to slide stably on the guide rails 2.

Figure 5:
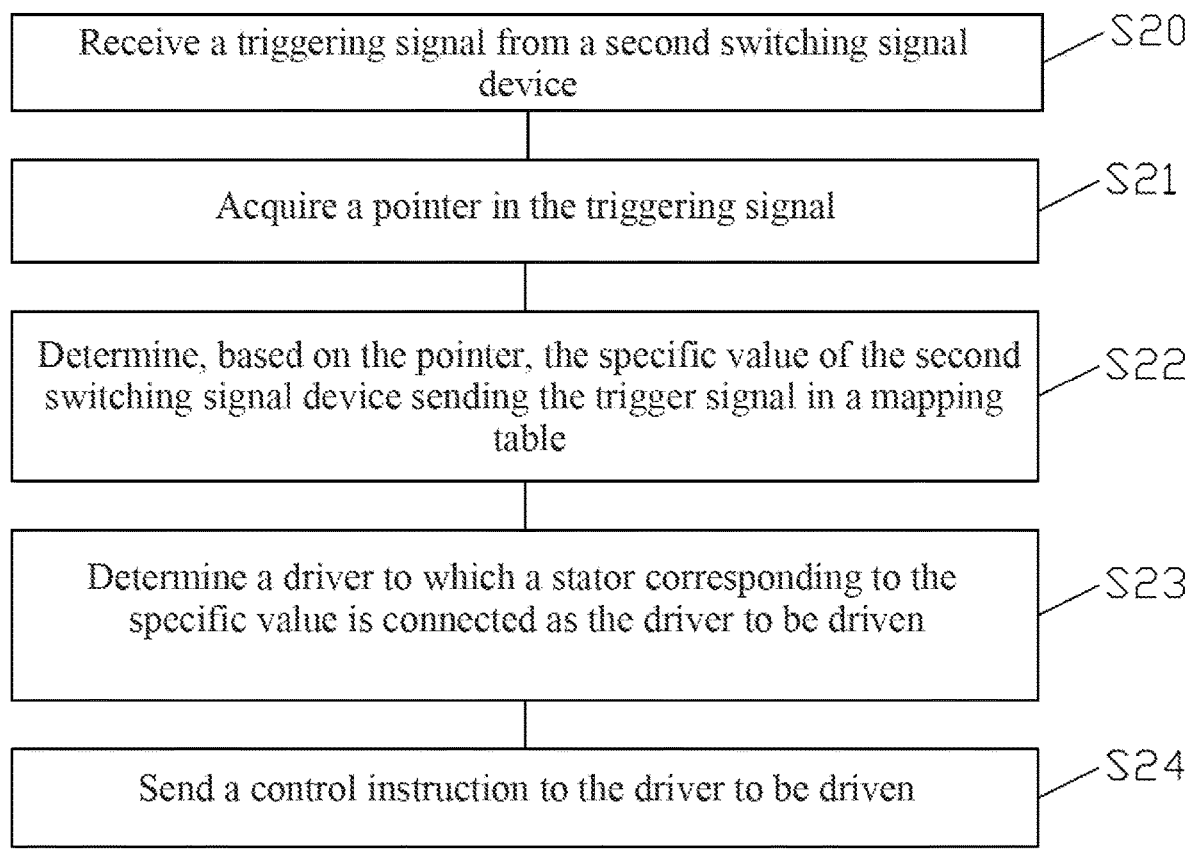
FIG. 5 is a specific flowchart of the control method for the direct drive transmission system according to embodiments of the present disclosure.

In some embodiments, a respective first switching signal device 5 is disposed at each end of the mover 4, and each of the two first switching signal devices 5 of the mover 4 can trigger a second switching signal device 6 to generate the triggering signal, in other words, a same second switching signal device 6 may be triggered for two times and generate two triggering signals at different moment. The two triggering signals correspond to different position of the mover 4, respectively. Each mover 4 matches with a driving range of a stator 3. Referring to FIG. 5, the control method for a direct drive transmission system may include the following operations:

At S20, a triggering signal from a second switching signal device 6 is received.

At S21, a pointer in the triggering signal is acquired.

At S22, the specific value of the second switching signal device sending the trigger signal is determined, based on the pointer, in a mapping table.

At S23, a driver to which a stator 3 corresponding to the specific value is connected is determined as the driver to be driven.

At S24, a control instruction is sent to the driver to be driven.

In some embodiments, the controller has a plurality of pins, and each pin of the plurality of pins is connected to a respective second switching signal device 6. Each pin is assigned with a pointer, and each point points to a position in the mapping table. At S22, the mapping table is preset in the controller and includes mapping relationships among pointers, the plurality of stators 3 and specific values. For the ease of understanding, the following is an example of the mapping table.

| Numbering of pointers | Specific values | Positions of stators |
| --- | --- | --- |
| Pointer 1 | A1 | The first stator located in the first low-accuracy segment |
| Pointer 2 | A2 | The second stator located in the first low-accuracy segment |

-continued

| Numbering of pointers | Specific values | Positions of stators |
|---|---|---|
| Pointer 3 | B1 | The first stator located in the second low-accuracy segment |
| Pointer 4 | B2 | The second stator located in the second low-accuracy segment |
| Pointer 5 | B3 | The third stator located in the second low-accuracy segment |
| Pointer 6 | C1 | The first stator located in the third low-accuracy segment |
| ... | ... | ... |
| Pointer 30 | F7 | The seventh stator located in the sixth low-accuracy segment |

Due to the magnetic field range of all magnetic steels 43 of a single mover 4 matches with the driving range of all windings of a single stator 3, a driver to which a stator 3 corresponding to the specific value is connected is determined as the driver to be driven. According to actual requirements, when the magnetic field range of all magnetic steels 43 in a single rotor 4 is greater than the driving range of all windings of a plurality of stators 3, the drivers to which the stators 3 corresponding to the specific values are connected and the drivers to which the stators 3 located between the stators 3 corresponding to the specific values are connected are all determined as the drivers to be driven.

In some embodiments, a respective second switching signal device 6 is disposed at the front end of each stator 3. When a second switching signal device 6 is triggered for the first time (i.e. is triggered by the first switching signal device 5 disposed at the right end of the mover), it is indicated that the mover 4 is going to move into the driving range of the stator 3 corresponding to the second switching signal device 6, and the mover 4 is moving towards the stator 3. The driver to which the stator 3 is connected is the driver to be driven, and the controller sends a control instruction of outputting increased current to windings to the driver to be driven, to ensure acceleration performance of the mover 4. When the second switching signal device 6 is triggered for the second time (i.e. is triggered by the first switching signal device 5 disposed at the left end of the mover), it is indicated that the mover 4 has completely entered the driving range of the stator 3 corresponding to the second switching signal device 6, and the mover 4 is going to move away from the stator 3. The driver to which the stator 3 is connected is the driver to be driven, and the controller sends a control instruction of outputting decreased current to windings to the driver to be driven, to ensure acceleration performance of the mover 4, and to implement movement control of the mover 4 in a low-accuracy segment.

It is noted that the first position feedback device 7 and the second position feedback devices cooperate to detect a real-time position of the mover 4 during the mover 4 moves from a high-accuracy segment into a low-accuracy segment, thereby determining whether the mover 4 has entered the low-accuracy segment. When a part of the mover 4 cannot be detected, it is indicated that this part of the mover 4 has entered the low-accuracy segment, in this case, the controller controls the direct drive transmission system using the method as illustrated above. When the mover 4 moves from the low-accuracy segment into a high-accuracy segment, the real-time position of the mover 4 can be detected by the first position feedback device 7 and the second position feedback devices cooperating with each other, it is indicated that the mover 4 has entered the high-accuracy segment. In this case, the driver transmits the received real-time position information for the mover 4 to the controller, and the controller sends, according to the real-time position information for the mover 4, a control instruction to the driver, to implement movement control of the mover 4 in the high-accuracy segment.

In some embodiments, the operation S11 may include the following operations.

At S110, low-accuracy segments of the transmission line are sorted in the sliding direction of the mover 4, to obtain low-accuracy segments having numberings of a first level.

At S112, the plurality of second switching signal devices 6 located in a same low-accuracy segment are sorted in the sliding direction of the mover 4, to obtain the plurality of second switching signal devices 6 having numberings of a second level.

At S113, a numbering of the first level of a low-accuracy segment corresponding to the triggering signal and a numbering of the second level of a second switching signal devices 6 corresponding to the triggering signal are determined according to the triggering signal.

At S114, the determined numbering of the first level of the low-accuracy segment is combined with the determined numbering of the second level of the second switching signal devices 6, to obtain the specific value of the second switching signal devices 6.

At S115, the driver to which the stator 3 corresponding to the specific value is connected is determined as the driver to be driven.

In some embodiments, at S110, low-accuracy segments of the transmission line may be sorted in alphabetical order, for example, the first low-accuracy segment may have a numbering A of the first level, and the second low-accuracy segment may have a numbering B of the first level. At S111, the plurality of second switching signal devices 6 in the transmission line may be sorted in numerical order, for example, the first second switching signal devices 6 may have a numbering 1 of the second level, and the second second switching signal devices 6 may have a numbering 2 of the second level. Therefore, at S114, the second second switching signal devices 6 located in the first low-accuracy segment may have a specific value A2, and the first second switching signal devices 6 located in the third low-accuracy segment may have a specific value C1.

In some embodiments, each stator of the plurality of stators 3 has a front end facing towards the sliding direction of the mover 4, a respective second switching signal device 6 is disposed at the front end of each stator, and each second switching signal device of the plurality of second switching signal devices 6 is electrically connected to respective drivers to which each two adjacent stators of the plurality of stators 3 are connected. The operation S11 may include the following operations.

At S110, two stators 3 which are arranged to be adjacent to the second switching signal device 6 sending the triggering signal are determined according to the triggering signal.

At S111, a driver to which the two stators are connected is determined to be the driver to be driven.

The driver receives the triggering signal generated by the second switching signal device and transmits the triggering signal to the controller, and the controller sends, according to the triggering signal, a control instruction to the driver corresponding to the triggering signal, i.e. each driver has two triggering signals as input. In this way, number of position feedback devices can be reduced, control efficiency can be improved, and solution cost can be reduced.

In some embodiments, the stators located in the at least one low-accuracy segment of the plurality of stators 3 are driven by corresponding drivers of the plurality of drivers by sensorless control or frequency-converting control. When the drivers use sensorless control, the drivers use a sensorless algorithm to control the stators 3, and the sensorless algorithm includes any of sliding mode algorithm, model reference adaptive algorithm, state observer algorithm, Kalman filter algorithm, and Lomborg observation algorithm.

In some embodiments, all the drivers to which all stators 3 are connected are electrically connected to a same controller. In this way, significant differences in the output currents of different drivers or generation of currents that act on the mover 4 in different directions can be prevented, thereby preventing speed fluctuations caused by different control instructions received by the drivers during the movement of a same mover 4.

The above-described are only embodiments of the present disclosure. It should be noted that skilled persons in the art may make improvements without departing from the concept of the present disclosure. All these improvements fall into the scope of protection of the present disclosure.

What is claimed is:

1. A direct drive transmission system, comprising: a base plate; guide rails fixed to the base plate; a plurality of stators fixed to the base plate along an extension direction of the guide rails and sequentially connected to each other; a mover slidably fitted to the guide rails and arranged to space from the plurality of stators; a plurality of drivers; and a controller electrically connected to the plurality of drivers; wherein each driver of the plurality of drivers is electrically connected to a respective stator, and the plurality of stators are configured to drive the mover to slide on the guide rails; and wherein a transmission line composed of the plurality of stators is configured to have at least one low-accuracy segment and at least one high-accuracy segment connected to each other; the direct drive transmission system further comprises at least one first switching signal device fixed to the mover, and a plurality of second switching signal devices fixed to the base plate, wherein each stator of stators located in the at least one low-accuracy segment of the plurality of stators is in correspondence to a respective second switching signal device, the at least one first switching signal device aligns with a respective second switching signal device, and each second switching signal device of the plurality of second switching signal devices is electrically connected to a respective driver or the plurality of second switching signal devices are all electrically connected to the controller; wherein each stator of the plurality of stators comprises a first magnet fixed to the base plate, a plurality of protrusions protruded from the first magnet in a direction away from a surface of the base plate, and a plurality of coils, wherein each coil of the plurality of coils is wound on an outer surface of a respective protrusion; and wherein the plurality of protrusions are arranged at intervals along the extension direction of the guide rails, each two adjacent coils are arranged to space from each other, and all coils of a stator are electrically connected to a corresponding driver; wherein the mover comprises a mounting plate slidably fitted to the guide rails, a second magnet fixed on a side of the mounting plate facing towards the base plate, and a plurality of magnetic steels fixed on a side of the second magnet away from the mounting plate, wherein each magnetic steel of the plurality of magnetic steels is in correspondence to and aligns with a respective coil, and the plurality of magnetic steels are arranged to space from the plurality of protrusions.

2. The direct drive transmission system according to claim 1, wherein each stator of the plurality of stators has a front end facing towards a sliding direction of the mover, and a respective second switching signal device is disposed at the front end of each stator; and
wherein the direct drive transmission system comprises two first switching signal devices, and each first switching signal device of the two first switching signal devices is disposed at a respective end of the mover.

3. The direct drive transmission system according to claim 2, wherein each second switching signal device of the plurality of second switching signal devices is electrically connected to respective drivers to which each two adjacent stators of the plurality of stators are connected.

4. A control method for a direct drive transmission system, applicable to the direct drive transmission system according to claim 1, comprising: receiving a triggering signal from a second switching signal device; determining a driver to be driven according to the triggering signal; and sending a control instruction to the driver to be driven.

5. The control method according to claim 4, wherein the mover has two first switching signal devices, each first switching signal device of the two first switching signal devices is disposed at a respective end of the mover, and determining the driver to be driven according to the triggering signal, comprises:
acquiring a specific value of the second switching signal device sending the triggering signal, wherein the specific value refers to a sequence number of a stator corresponding to the second switching signal device in a sliding direction of the mover; and
determining a driver to which the stator corresponding to the specific value to be the driver to be driven.

6. The control method according to claim 5, wherein acquiring the specific value of the second switching signal device sending the triggering signal, comprises:
acquiring a pointer in the triggering signal; and
determining, based on the pointer, the specific value of the second switching signal device sending the trigger signal in a mapping table, wherein the mapping table is preset in the controller and comprises mapping relationships among pointers, the plurality of stators and specific values.

7. The control method according to claim 4, wherein each stator of the plurality of stators has a front end facing towards a sliding direction of the mover, a respective second switching signal device is disposed at the front end of each stator, and each second switching signal device of the plurality of second switching signal devices is electrically connected to respective drivers to which each two adjacent stators of the plurality of stators are connected, wherein determining the driver to be driven according to the triggering signal, comprises:
determining, according to the triggering signal, two stators which are arranged to be adjacent to the second switching signal device sending the triggering signal; and
determining a driver to which the two stators are connected to be the driver to be driven.

8. The control method according to claim 4, wherein the stators located in the at least one low-accuracy segment of the plurality of stators are driven by corresponding drivers of the plurality of drivers by sensorless control or frequency-converting control, and the corresponding drivers are all electrically connected to the controller.

* * * * *